Jan. 30, 1951　　F. L. WEINHEIMER, SR　　2,540,039
COASTER BRAKE
Filed Dec. 26, 1947　　　　　　　　　　　　　2 Sheets—Sheet 1
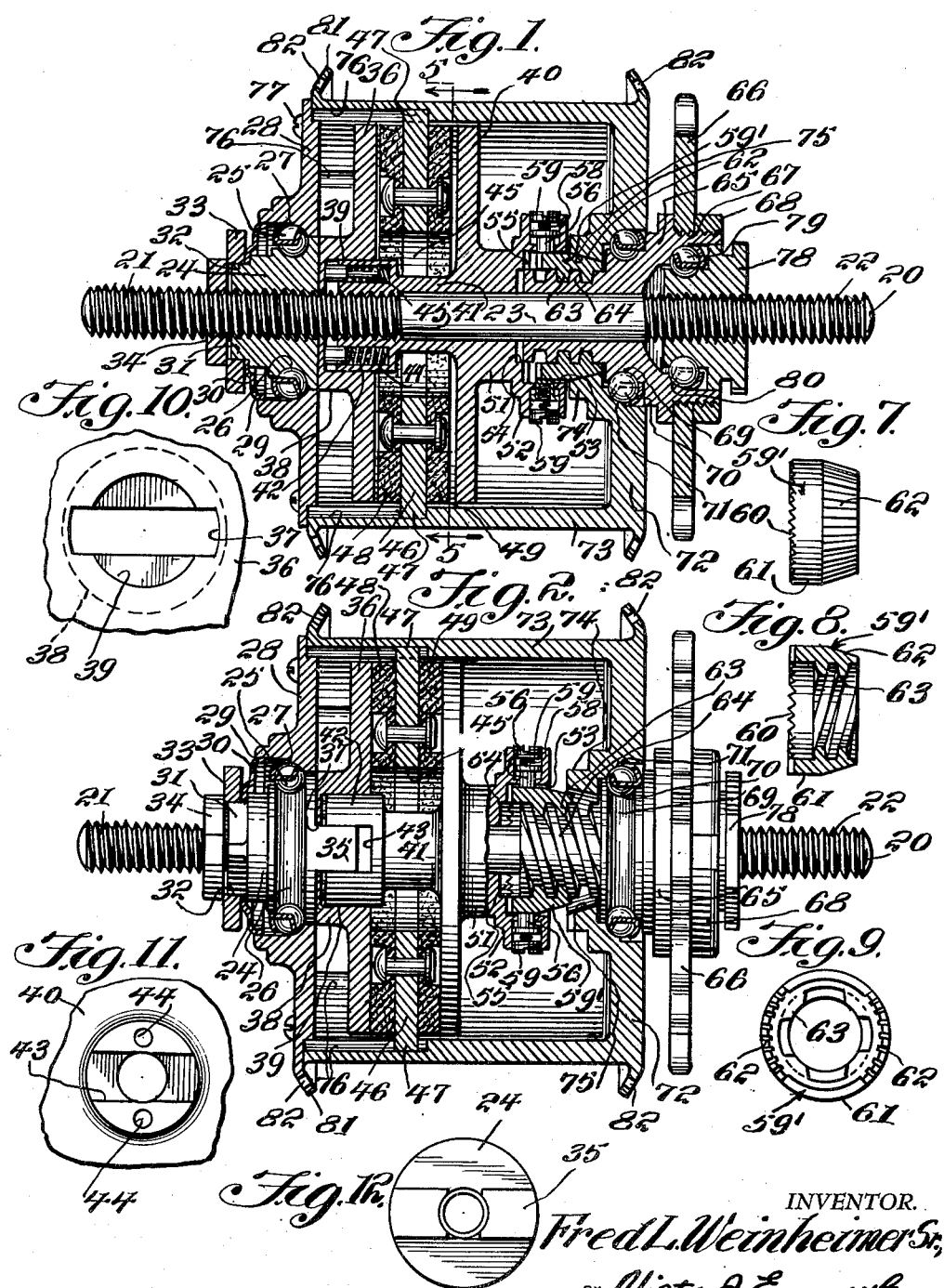
INVENTOR.
Fred L. Weinheimer Sr.,
BY Victor J. Evans & Co.
ATTORNEYS

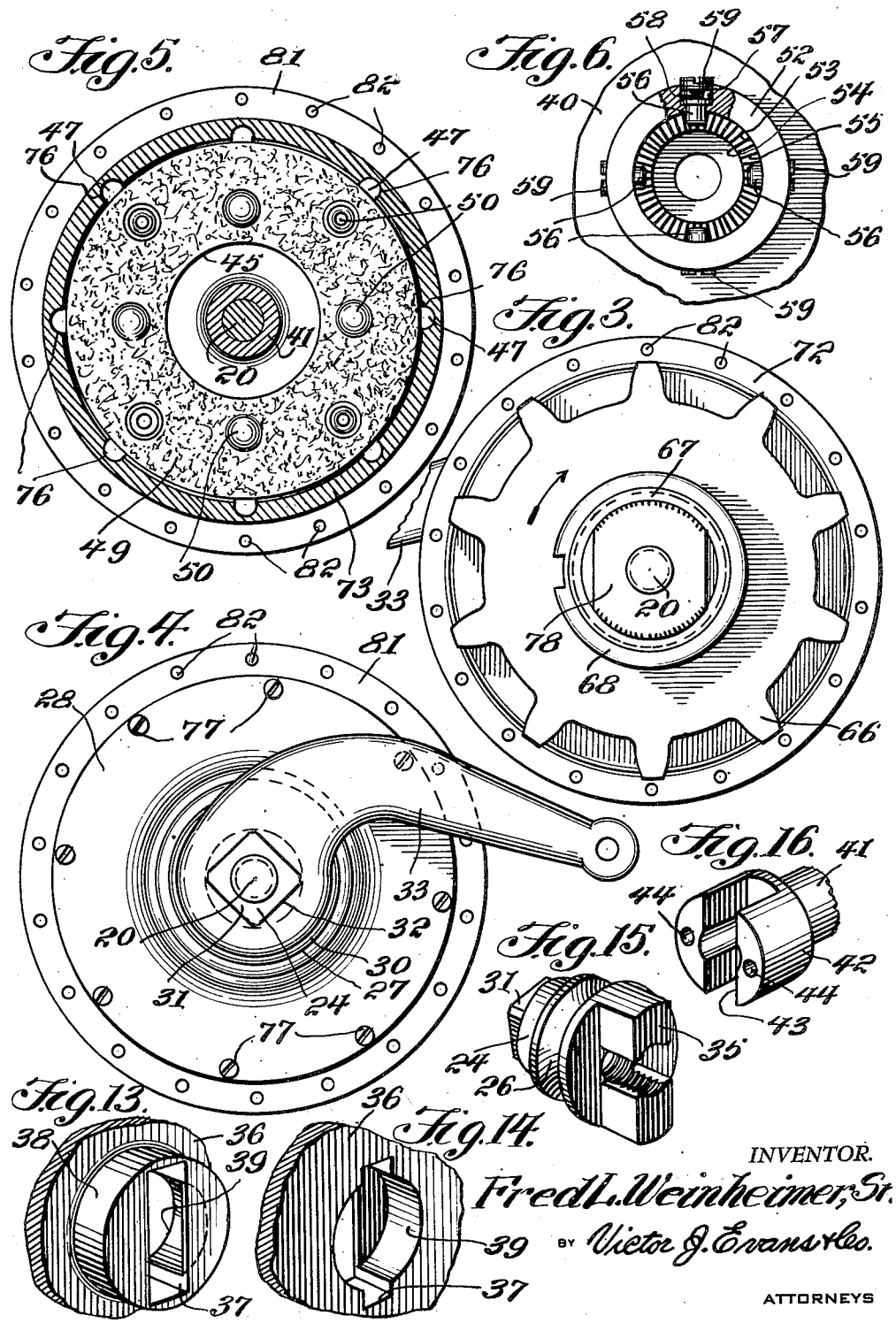

Patented Jan. 30, 1951

2,540,039

UNITED STATES PATENT OFFICE 2,540,039

COASTER BRAKE

Fred L. Weinheimer, Sr., South River, N. J.

Application December 26, 1947, Serial No. 793,907

3 Claims. (Cl. 188—26)

This invention relates to a coaster brake for wheeled vehicles and more particularly to coaster brakes for bicycles.

It is an object of the invention to provide a coaster brake for wheeled vehicles, including a single disk brake which is lined with asbestos or other suitable braking material on both faces thereof, which is operated by the reverse action of the pedals as is customary with bicycle coaster brakes of conventional type.

Due to the effective operation of the brake embodying the invention, it is very effective in use with power driven bicycles or under extremely hilly conditions or where fast stopping is desirable.

A further object of the invention is to provide a coaster brake for wheeled vehicles which is simple in construction, made of durable parts and is compact and efficient in operation.

With the above and other objects and advantages as will appear during the description of the invention, when taken in connection with the accompanying drawings in which:

Figure 1 is a longitudinal, sectional view of the coaster brake forming an embodiment of the invention;

Figure 2 is a view partly in elevation and partly in section designed to show the internal clutching elements of the coaster brake;

Figure 3 is an end elevational view of the coaster brake looking at the sprocket wheel thereof;

Figure 4 is an end elevational view of the coaster brake looking at the brake anchor arm of the coaster brake;

Figure 5 is a vertical, sectional view on the line 5—5 of Figure 1;

Figure 6 is a detailed fragmentary elevational view, partly in section of one of the brake pressure plates;

Figure 7 is an elevational view of the movable clutch member;

Figure 8 is a vertical, sectional view of the member shown in Figure 7;

Figure 9 is a rear elevational view of Figure 7;

Figure 10 is a detailed fragmentary elevational view of the rear face of the other of the brake pressure plates;

Figure 11 is a detailed fragmentary, elevational view of the opposite side of the pressure plate shown in Figure 6;

Figure 12 is a face view of the pressure disk supporting sleeve;

Figure 13 is a detailed fragmentary front perspective view of Figure 10;

Figure 14 is a detailed fragmentary rear perspective view of Figure 13;

Figure 15 is a perspective view of the pressure disk support sleeve and

Figure 16 is a fragmentary perspective view of Figure 11;

Referring more in detail to the drawings, the reference numeral 20 designates the axle or shaft on which the various elements of the coaster brake embodying the invention are assembled. It will be seen that the axle 20, at one end, is provided with a threaded portion 21, and at the opposite end with a similar threaded portion 22. These portions are separated from each other by the smooth portion 23 of the axle. This is the conventional structure of axles of this type that are used for the usual coaster brakes.

Threadedly mounted on the portion 22 of the axle 20 is the pressure disk supporting sleeve or nut 24. The sleeve 24 carries the ball race 25 in the circumferential groove 26, and the race 25 is removable in complementary shaped recess 27 in the end drum plate 28. Mounted on the sleeve 24, with its peripheral flanged edge 29 receivable in the recess 27 in the plate 28, is the dust cap or washer 30. Outwardly of the cap 30, the sleeve 24 is provided with a square shaped portion or projection 31, which is receivable in the complementary shaped opening 32 of the anchor brake arm 33. The elements mounted on the axle 20 are retained in assembled formation by a lock nut 34, then threaded on the portion 21 of the axle 20 outwardly of the arm 33.

The sleeve, on the end opposite to the portion already described, is provided with the flat faced transverse projection 35 through which, at the center thereof, extends the axle 20.

The disk shaped pressure plate 36 is then placed on the axle 20. The projection 35, extending beyond the inner face of the end plate 28, is receivable in the complementary shaped slot 37 in the circular projection 38, formed on one face of the pressure plate 36. The slot 37 extends through the opposite face of the pressure plate 36 and the plate and projection 38 in the rear thereof are cut out as shown at 39, Figures 13 and 14.

The second pressure plate 40 is then positioned on the axle 20. On one side of the plate 40, there is provided a projection 41 having the enlarged circular head end 42. This head is provided with a slot 43 which engages the projections 35, and the head 42 is receivable in cutout 39 in the plate 36. The face of the head 42 is provided along its central line, at right angles to the slot 43, with the opposed sockets 44 which carry the spring pressed plungers 45 which, engaging the bottom of the cutout 39, tends to force the head 42 outwardly of the cutout.

The projection 41 passes through the central opening 45 of the brake plate 46, so that the plate 46 is substantially sleeved on the projection 41 in floating relation thereto. The periphery of the plate 46 is provided with relatively spaced teeth 47 for a purpose to be later described. Secured to both faces of the plate 46 are the similar shaped asbestos or other suitable brake material linings 48 and 49 respectively. The linings are secured to the plate by the soft rivets 50, as shown in Figure 5. The linings 48 and 49 are engaged by the pressure plates 36 and 40 for the actuation of the brake assembly, as will be later described.

On its opposite face, the plate 40 is provided with the circular projection 51, having the enlarged head end 52. The head end 52 has the circular recess 53 in its outer face, which communicates with a smaller circular recess 54 in the projection 51, and the shoulder formed by the variation in size of these recesses is provided with a toothed face 55. Extending into the recess 53, in radially spaced relation to each other, are the drag pins 56 which are slidably mounted in the relatively spaced sockets 57 in the head 52. A spring 58, engaging the rear end of each pin 56, urges the pin outward of the socket. An adjusting screw 59, engaging the spring 58, tensions the spring to relieve or apply more pressure on the pin 56.

A clutch element 59 is then placed on the axle 20, and the rear toothed face 60 thereof is adapted to engage the toothed face 55 of the shoulder formed by the recesses 53 and 54. The clutch portion has a shoulder 61 receivable in the recess 53 and a tapered roughened face 62, outwardly of the shoulder 61. The clutch portion 59 is internally threaded at 63 to receive the threaded projection 64 of the clutch sleeve 65. At its opposite end, the sleeve 65 carries the sprocket 66 on the reduced threaded portion 67, and a lock nut 68 on the portion 67 retains the sprocket 66 in fixed relation to the sleeve 65.

The sleeve is provided with an annular groove 69 mounting the ball race 70 therein, and the circular recess 71 of the drum plate 72 of the drum 73 receives the ball race 70 for the mounting of the drum thereon. On its inner face, the plate 72 is provided with the circular projection 74 having the tapered central opening 75 which is adapted to engage the tapered face 62 of the clutch element 59.

As the drum is moved over the axle 20, the teeth 47 will slide into the complementary shaped and spaced elongated grooves 76 on the inner surface of the drum 73. When the drum abuts the plate 28, fasteners 77 are used to secure the plate 28 to the drum. The fasteners 77 are spaced intermediate of the grooves 76 so that there is no interference between the two.

The coaster brake is firmly assembled by engaging the lock nut 78 with the threaded portion 22 of the shaft 20. The nut 78 carries the ball race 79 which is receivable in the circular recess 80 of the portion 67.

As is customary, the plate 72 and the flange 81 are provided with spaced openings 82 for the reception of the spokes of the wheel mounted on the drum 73 in the conventional manner.

During clockwise motion of the pedals of the wheeled vehicle, the drum will freely rotate on the ball races provided for the free rotation thereof. The brake 46 is rotated with the drum, due to the coaction of the teeth 47 with the grooves 76 in the inner surface of the drum. The linings 48 and 49 are free of contact with the plates 36 and 40, due to the floating action of the plate 46. However, by back pedalling or reverse action of the pedals, the sprocket, through the threads on the projection 64, forces the plate 40 toward the plate 46, and the plate 46 toward the plate 36 to eventually bind the brake plate and effectively stop the vehicle. The drag pins 56 engaging the clutch member as it screws inwardly and outwardly according to the direction of pressure on the pedals, create a slight change on the clutch, to be sure the clutch rotates in the proper manner as the internal threads of this member and the external threads of the projection 64 engage.

The spring pressed plungers retain the plates 36 and 40 away from each other, thus providing a very well balanced free running wheel.

It is believed that from the foregoing description, the operation and structure of the coaster brake will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A coaster brake of the type described comprising a central axle, a first pressure plate on the axle, a pressure disk supporting sleeve on said axle outwardly of said plate, a projection on the outer face of said sleeve, an anchor brake arm having an opening therein to receive said projection, a projection on the inner face of said sleeve, a circular projection on said plate in engagement with said sleeve having a slot therein adapted to receive the projection on the inner face of said sleeve, a second pressure plate on the axle spaced from the first pressure plate, a projection on said second pressure plate extending toward said first pressure plate and receivable in the circular projection on said first pressure plate, coacting means on the projection on the sleeve and the projection on the second pressure plate so that said projections are coactively engaged with each other during operation of the brake, a brake plate surrounding the axle intermediate of the first and second pressure plates and having floating relation with the projection on said second pressure plate, brake lining on both sides of said brake plate adapted to engage the inner faces of said first and second pressure plates, means for forcing said second pressure plate into engagement with said brake plate to create a braking action between said first and second pressure plates and said brake plate, means within the projection on said first and second pressure plates to return said first and second pressure plates to non-braking position and a housing for said first and second pressure plates and said brake plate.

2. The coaster brake as in claim 1 wherein the means for returning said pressure plates to non-braking position comprises spring pressed plungers that are adapted to engage said pressure plates at their outer ends.

3. The invention as in claim 1, wherein the periphery of said brake plate is provided with relatively spaced teeth and said housing is provided with complementary spaced and shaped grooves to receive said teeth, whereby said brake plate and housing simultaneously rotate.

FRED L. WEINHEIMER, Sr.

REFERENCES CITED

The following references are of record in the file of this patent:

UNITED STATES PATENTS

| Number | Name | Date |
|---|---|---|
| 654,053 | Cuthbert | July 17, 1900 |
| 1,212,669 | Page | Jan. 16, 1917 |
| 1,457,311 | Ludwig | June 5, 1923 |
| 1,947,961 | Winkler | Feb. 20, 1934 |